(12) United States Patent
Mote et al.

(10) Patent No.: US 6,563,927 B2
(45) Date of Patent: May 13, 2003

(54) BACK COVER FOR A MOBILE PHONE (75) Inventors: Steven Mote, Charlton Musgrove (GB); Keith Johnson, Bracknell (GB)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,761

(22) Filed: Oct. 26, 1999

(65) Prior Publication Data

US 2002/0131584 A1 Sep. 19, 2002

(51) Int. Cl.[7] .................................................. H04M 1/00
(52) U.S. Cl. .................................................. 379/433.11
(58) Field of Search ................................. 379/433, 428, 379/433.08, 433.01, 433.11; 455/90, 575

(56) References Cited

U.S. PATENT DOCUMENTS 4,904,549 A * 2/1990 Goodwin et al. ............ 379/433
5,308,716 A * 5/1994 Shaboby et al. ............. 379/433

FOREIGN PATENT DOCUMENTS

| GB | 2224595 | 5/1990 | ............ H01M/2/02 |
| GB | 2285657 | 7/1995 | ......... H01R/13/627 |

* cited by examiner

Primary Examiner—Jack Chiang
(74) Attorney, Agent, or Firm—Antonelli, Terry, Stout & Kraus, LLP (57) ABSTRACT

A back cover for a mobile phone is described. The cover comprises an elongate body having an outer surface exposed on attachment to the phone and inner surfaces comprising first and second guiding surfaces; and lockable restraining means arranged to co-operate with corresponding restraining means of the phone on the movement of the cover with respect to the phone along said guiding surfaces, thereby preventing substantial movement of the body with respect to the phone in said lengthwise direction. The lockable restraining means of the cover or the corresponding restraining means of the phone comprises a resilient, outwardly flexible part. This part resiliently flexes on said movement of the cover with respect to the phone along said guiding surfaces and forms a user releasable locking engagement between the cover and the phone. The locking engagement is released by the user pulling outwards on the member.

30 Claims, 4 Drawing Sheets

BACK COVER FOR A MOBILE PHONE

BACKGROUND OF THE INVENTION

The present invention relates to a cover for a mobile phone and in particular a back cover for a mobile phone.

Back covers are typically used in mobile phones to keep the battery cell in position. The cover may house the battery or the battery may be housed in the phone itself.

It is desirable for the cover to easily attach to a phone and to be securely fastened thereto. It is preferable for a user to be able to detach and attach the cover so that the battery can be replaced. Current back covers for mobile phones are carefully designed to fulfill these functions. For example in the NOKIA 6110 handset, the back cover contains a sprung latch mechanism. A spring loaded 'bolt' extends from each side of the cover. When the cover is attached to the phone the bolts are forced to retract opening a latch. The bolts extend when the cover is slid into its final position closing the latch. The bolts prevent the cover being removed from the phone. A button on the back of the cover is coupled to the bolts. When the button is depressed the bolts retract opening the latch and allowing the cover to be removed.

GB 2,224,5595 and GB 2,285,657 describe battery housings for removable attachment to a mobile phone body. Each housing has a latch including a catch on its interior and a pushable portion on its exterior. The catch engages a pocket in the body of the phone and holds the housing in place. Pushing the exterior portion causes a cantilevered torsion beam to rotate and the catch to be retracted from the pocket. This allows the removal of the housing. The latch mechanism is integrally connected to the housing via both ends of the torsion bar but is otherwise detached from the housing. The torsion bar has the pushable portion and the catch extending therefrom in opposite directions. The catch towards the centre of the housing and the pushable portion towards the edge of the housing. GB 2,285,657 additionally describes the use of an angled surface at the leading portion of the catch and a correspondingly angled surface adjacent the pocket in the phone body. When the cover is attached to the body by sliding movement the surfaces cooperate to force the catch "up and over" into the pocket.

It would be desirable to produce a simple cover which functions well. However, moving the sprung components from the cover into the phone is undesirable as it uses up room in the phone.

SUMMARY OF THE INVENTION

According to one aspect of the present invention there is provided a cover, for attachment to a mobile phone, comprising: an elongate body having an outer surface exposed on attachment to said phone and inner surfaces comprising guiding surfaces; and lockable restraining means arranged to co-operate with corresponding restraining means of the phone on said movement of the cover with respect to the phone along said guiding surfaces, said lockable restraining means preventing substantial movement of the body with respect to the phone, during said co-operation, in said lengthwise direction, wherein said lockable restraining means comprises a resilient, outwardly flexible member defining a part of said body's outer surface, the member being arranged to resiliently flex and form a user releasable locking engagement with the corresponding restraining means of the phone on said movement of the cover with respect to the phone along said guiding surfaces and arranged to be pulled outwards by the user to release said locking engagement.

According to another aspect of the present invention there is provided a mobile phone, having a cover attached thereto, said cover comprising: an elongate body having an outer surface exposed on attachment to said phone and inner surfaces comprising first and second guiding surfaces; and lockable restraining means arranged to co-operate with corresponding restraining means of the phone on said movement of the cover with respect to the phone along said guiding surfaces, and thereby preventing substantial movement of the body with respect to the phone in said lengthwise direction, wherein said lockable restraining means of the cover or the corresponding restraining means of the phone comprises a resilient, outwardly flexible member arranged to resiliently flex and form a user releasable locking engagement between the lockable restraining means and the corresponding restraining means on the phone on said movement of the cover with respect to the phone along said guiding surfaces and arranged to be pulled outwards by the user.

The cover is lightweight and the locking mechanism is simple and small. The use of the cover therefore has weight and space advantages.

The member is preferably positioned at the edge of the body. The member may extend from the edge of the cover and form a cantilever. The member is preferably located in a symmetric position at the edge of the cover. The member is preferably integral with the cover.

The cover may be one-piece. Preferably the cover is formed from injection moulded plastics. Consequently the cover has no internal components such as springs or levers and is very easy to manufacture.

The resilient flexibility of the member preferably arises in part or in whole from the deformation of the cover. The cover is preferably held at its lateral edges to the phone while the member is pulled by the user. This outward force applied to the cover through the member causes the cover to bow about its lengthwise axis as its lateral edges are held.

The resilient flexibility of the member preferably arises in part or in whole from the flexibility of the cantilevered member about is point of attachment to the body.

Holes, cut-outs or apertures are not required in the back of the cover to provide for the flexibility of the member, which may improve the phone's water resistance.

The flexible member may have a face for abutment, substantially perpendicular to said lengthwise direction, forming a part of said inner surfaces. This face abuts with a corresponding face defined by the phone, which is also substantially perpendicular to the lengthwise direction. This face and the corresponding face prevent substantial movement of the body with respect to the phone and form part of the user releasable locking engagement.

The flexible member may have a camming surface, forming a part of said inner surfaces. The camming surface is arranged to co-operate with a corresponding camming surface of the phone such that on movement of the cover in a lengthwise direction to attach the cover to the phone, the guiding surfaces co-operate to force said member to flex.

The camming and abutting surfaces on the flexible member are preferably adjacent and preferably form surfaces on a protrusion from the underside of the flexible member. The phone then has a corresponding recess with the corresponding abutting surface forming part of the recess and the corresponding guiding surface positioned adjacent said recess. On movement of the cover in a lengthwise (upwards) direction, the projection and flexible member ride up and over the corresponding camming surface. The resilient member springs back to its non-flexed position placing the protrusion in the recess. Movement of the cover in a downward direction urges the abutting surface and corresponding abutting surface together. A locking arrangement is thus formed in which the projection forms a tenon and the recess forms a mortice.

The phone may be provided with a depression on its back surface adjacent the recess. A user may then unlock the lockable restraining means by placing a fingernail under the flexible member, flexing the member in an outwards direction and simultaneously urging the cover in the downwards direction. The member may extend from one edge of the body. Preferably the member extends from the top edge of the body; 'top' being defined by the direction of the upwards sliding movement of the cover with respect to the phone to form said user releasable locking engagement.

The lockable restraining means may comprise third and fourth restraining means positioned with lengthwise separation, said fourth restraining means comprising said flexible member.

The flexible member is preferably positioned at the top of the body and is used to prevent, when in locking engagement, at least the movement of the cover in the downwards direction. The third restraining means is used to restrain the movement of the cover in at least the upwards direction.

The third and fourth restraining means may be positioned at opposing lengthwise extremities of the body. The positioning of the third and fourth restraining means towards the extreme top and bottom ends of the cover provides a better fit between the cover and phone.

The third restraining means may define a face for abutment, substantially perpendicular to said outwards direction, forming a part of said inner surfaces. This face is arranged to abut with a corresponding face of the phone, if the cover is moved with respect to the phone in an upwards direction when the cover is being fitted to the phone. The third restraining means and its corresponding restraining means of the phone thus form on the upward sliding movement of the cover with respect to the phone, a clasp that prevents removal of the cover. The face may slant forming an acute angle to the lengthwise direction. The corresponding face of the phone is correspondingly slanted. When the cover is moved upwards with respect to the phone the slanting or beveled face of the third restraining means and the corresponding face abut. This causes the cover to be urged into close contact with the phone. Additionally this abutment prevents the movement of the cover in the outward direction and limits the extent of movement in the upward direction.

The third restraining means may be a tongue extending from the inner surfaces of the body substantially in said lengthwise direction. The tongue may be inserted in and abut with a slot in said phone The cover may further comprise releasable restraining means arranged to releasably co-operate with correspondingly positioned restraining means of the phone on movement of the cover with respect to the phone along said guiding surfaces, said releasable restraining means allowing substantial movement of the body with respect to the phone, during said co-operation, in said lengthwise direction only.

The releasable restraining means may be positioned on the inner surfaces of the body and comprise first and second restraining means; each of said first and second restraining means defining a first face for abutment, substantially perpendicular to said outward direction but forming an acute angle to the lengthwise direction.

The first faces are arranged to abut with corresponding faces of the phone, also substantially perpendicular to the lengthwise direction, to prevent substantial movement of the body with respect to the phone, during said co-operation, in said outward direction. Each of the first and second restraining means with their corresponding restraining means of the phone thus form on the upward sliding movement of the cover with respect to the phone, a clasp which prevents removal of the cover in the outward direction.

The corresponding faces of the phone are correspondingly slanted. When the cover is moved upwards with respect to the phone to form the releasable locking engagement the slanting or beveled first face and the corresponding faces abut. This causes the lateral edges of the cover to be urged into close contact with the phone. Additionally this abutment prevents the movement of the cover in the outward direction and limits the extent of movement in the upward direction with respect to the phone.

The first and second restraining means may each define a second face, substantially perpendicular to said lengthwise direction. The second faces can act as stops preventing excessive movement of the cover on release of said lockable restraining means, by abutting with corresponding faces of the phone also perpendicular to the lengthwise direction of the phone.

The first and second restraining means may each define a third face, substantially parallel to said second face and positioned opposite said second face with a lengthwise displacement thereto. The third faces and second faces can act as stops preventing the misalignment of the cover with the phone on fitting the cover to the phone, by abutting with corresponding faces of the phone.

The first restraining means may be a lengthwise extending recess or a protrusion with the corresponding restraining means on the phone being a protrusion or a lengthwise extending recess respectively. The protrusion may also extend lengthwise. Corresponding recesses and protrusions co-operate to prevent substantial movement of the cover other than in said lengthwise direction. The first, second and third faces form the external faces of a protrusion or the internal faces of a recess. Access to the recess by said protrusion is restricted so that the cover cannot be incorrectly attached to the phone.

The first and second restraining means may be positioned adjacent said guiding surfaces. There may be first and second guiding surfaces running substantially parallel to the length of the body. The guiding surfaces may be positioned at opposing lateral extremities of the body. The guiding surfaces may extend the length of the body.

The guiding surfaces may be substantially flat, with each surface having one or more low relief bumps thereon.

The cover may have at least one point along its length a cross-section having the shape substantially of a shallow U with the third and fourth restraining means positioned on the opposing inner surfaces.

According to another aspect of the invention there is provided a cover, for attachment to and detachment from a mobile phone, comprising: an elongate body having an outer surface exposed on attachment to said phone and inner surfaces comprising first and second guiding surfaces extending substantially parallel to the length of the body; and a resilient outwardly flexible member having an upper surface defining a part of said body's outer surface and a lower surface having a recess defined therein or a protrusion extending therefrom wherein the member is positioned at an edge of the body and arranged to be pulled outwards by a user, the member outwardly flexing for detaching the cover.

According to a still further aspect of the present invention there is provided a mobile phone, having a user attachable/detachable cover attached thereto, said cover comprising an elongate body having an outer surface exposed on attachment to said phone and inner surfaces comprising first and second guiding surfaces extending substantially parallel to the length of the body; and a resilient outwardly flexible member having an upper surface defining a part of said body's outer surface and a lower surface having a recess defined therein or a protrusion extending therefrom wherein the member is positioned at an edge of the body and arranged to be pulled outwards by a user, member thereby outwardly flexing to detach the cover.

The recess or protrusion of the flexible member may be arranged to form respectively a mortice or tenon of a locking arrangement with a phone on said movement of the cover with respect to the phone along said guiding surfaces.

The cover may also comprise releasable restraining means having a pair of recesses or protrusions extending substantially parallel to said guiding surfaces and positioned at opposing lateral extremities of the body.

The resilient flexibility of the member may arise from the flexibility of the cover to which it is attached, the cover deforming to form the releasable locking engagement.

BRIEF DESCRIPTION OF THE DRAWINGS

For a better understanding of the present invention and to understand how the same may be brought into effect, reference will now be made by way of example only to the accompanying figures in which.

DETAILED DESCRIPTION OF THE INVENTION

Figure 1:
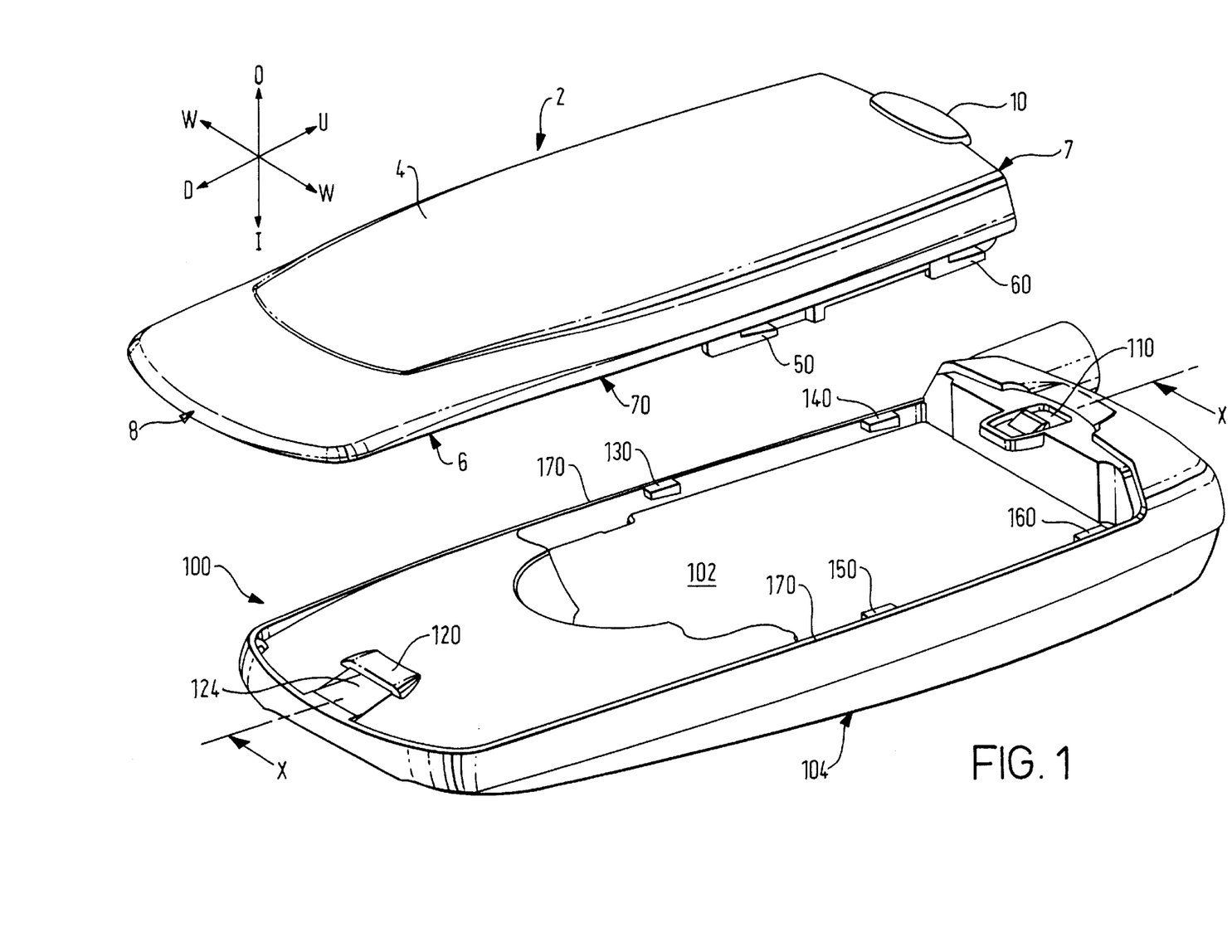
FIG. 1 is an oblique view of a mobile phone and a cover before attachment of the cover to the phone.

FIG. 1 illustrates a mobile telephone having a casing 100 and a cover 2 for attachment to the phone. The phone has a front face 104 and, in its back, a recess 102 for receiving a battery cell. The cover 2 prevents the battery from falling out and keeps the battery dry.

Figure 2:
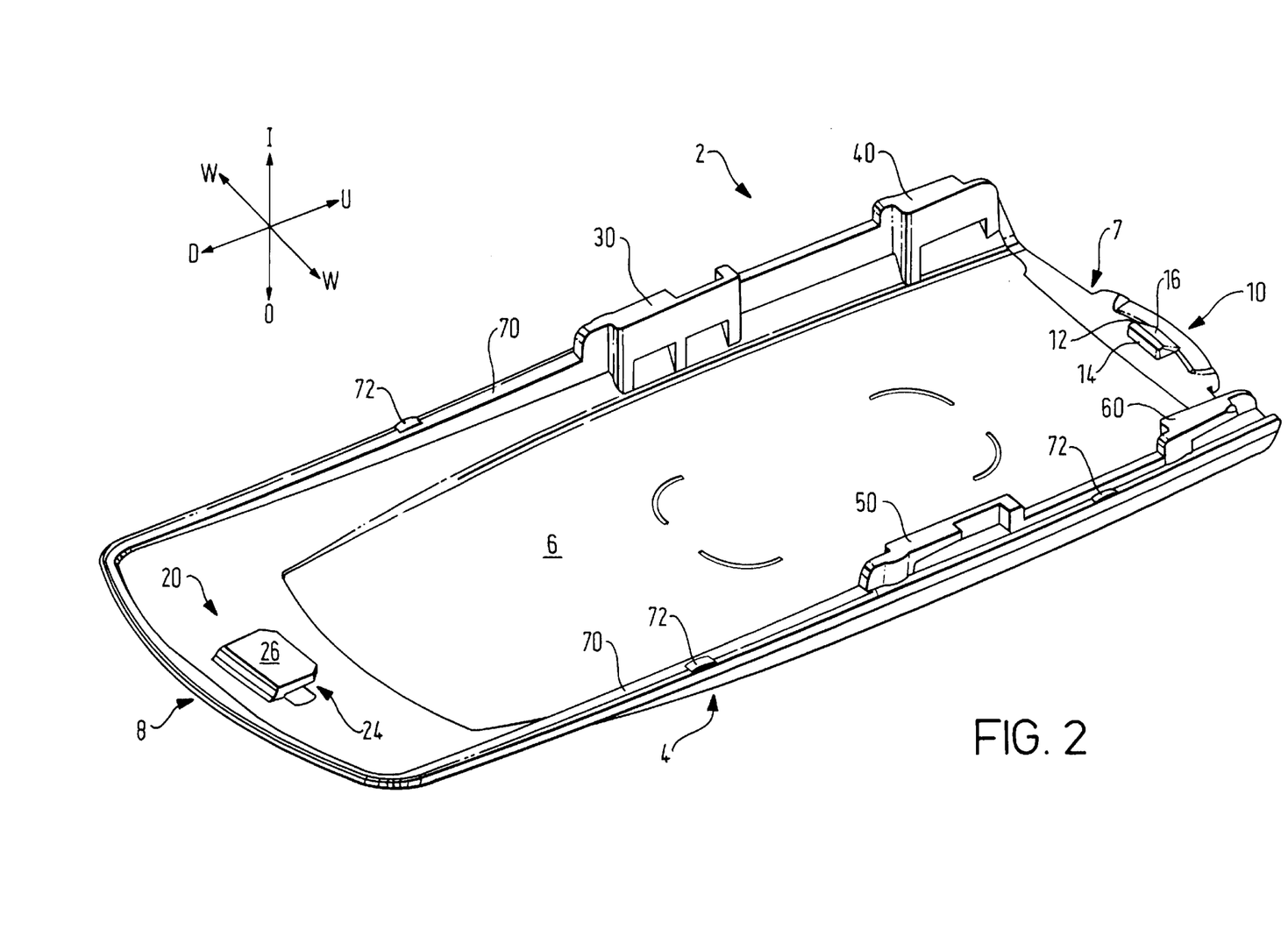
FIG. 2 is an oblique elevated view of the backside of a cover.
Figure 3:
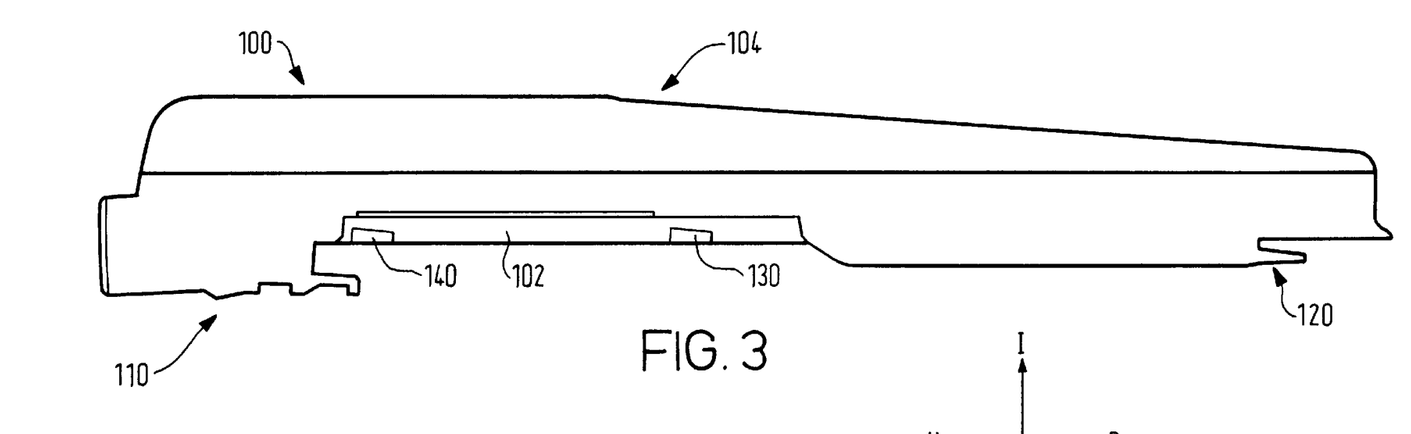
FIG. 3 is a cross-sectional view of the mobile phone taken along the line XX in FIG. 2.

The cover has an outer surface 4 and inside surfaces 6 illustrated in more detail in FIG. 2. It has guiding surfaces 70 running along each lateral edge of the inside of the cover, a resilient flexible member 10, having a protrusion 12 on its underside, positioned at the top 7 of the cover, a first clasp 20 positioned on the inside of the cover towards the bottom 8 of the cover, second and third clasps 30 and 40 positioned on the inside of the cover at one of the lateral edges of the cover adjacent one guiding surface 70 and fourth and fifth clasps 50 and 60 positioned on the inside of the cover at the other lateral edge of the cover adjacent the other guiding surface.

The phone 100 has guiding surfaces 170 which co-operate with the guiding surfaces 70 of the cover to allow the cover to slide on the phone casing, a receptacle 110 for forming a fastening with the protrusion 12 of the flexible member 10, a first corresponding clasp 120 positioned towards the bottom of the phone which forms a fastening with the first clasp 20 of the cover, and second, third, fourth and fifth corresponding clasps 130, 140, 150, 160 which each form a fastening with respective ones of the second, third, fourth and fifth clasps 30, 40, 50 and 60 of the cover 2.

A co-ordinate system is illustrated in each Figure. The co-ordinate system illustrates directions referred to in the following including lengthwise directions comprising an upwards direction U and a downwards direction D, lateral or widthwise directions D, an outwards direction O and an inwards direction I.

Figure 6:
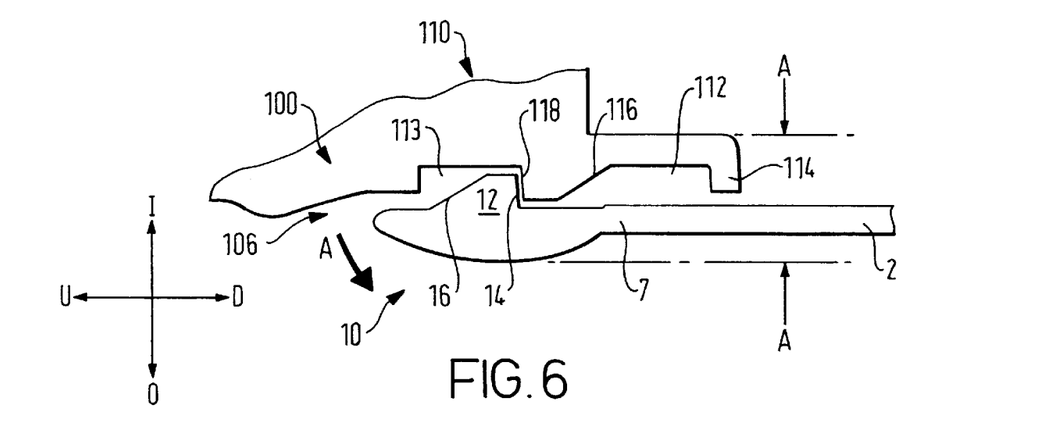
FIG. 6 shows another type of fastening which attaches the cover to the phone.

The resilient flexible member 10 and the receptacle 110 form a fastening illustrated in more detail in FIG. 6. The resilient flexible member 10 has a protrusion 12. The protrusion 12 has a sloping camming surface 16 which makes an acute angle to the lengthwise direction but which is parallel to the widthwise direction, and an abutting surface 14 which forms a plane perpendicular to the lengthwise direction. The camming surface 16 is adjacent to and upwards of the abutting surface 14. The receptacle 110 has a first recess 112, a stop 114 at the downwards end of the first recess 112, having a face perpendicular to the lengthwise direction, a sloping camming surface 116 at the upwards end of the first recess 112, a second recess 113 adjacent and upwards of the camming surface 116 having an abutting surface 118 perpendicular to the lengthwise direction, positioned at the downwards end of the second recess 113. It will be appreciated from FIG. 6, that the height of the fastening formed by the receptacle 110 and the member 10 and as illustrated by the arrows AA is small. The fastening formed functions as a lock with the protrusion 12 acting as a tenon and the second recess 113 acting as a mortice.

Figure 5:
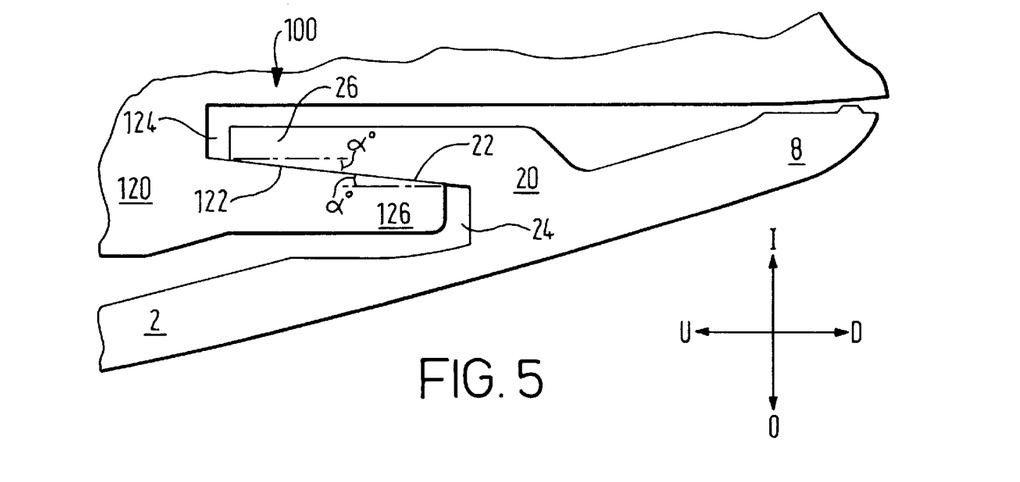
FIG. 5 shows one type of latching arrangement, which attaches the cover to the phone.

The first clasp 20 and the first corresponding clasp 120 form a fastening as illustrated in more detail in FIG. 5. The first clasp 20 has a protrusion or tongue 26. A recess 24 is formed between the protrusion which extends from the cover in the upwards direction and the cover 2, which at this point makes an acute angle with the lengthwise direction. The outward face of the protrusion 26 has an inclined abutting surface 22. The sloping abutting surface 22 forms a plane which is parallel to the widthwise direction and which forms an acute angle cc with the lengthwise direction. The first corresponding clasp 120 has a protrusion 126, which defines a slot 124 between itself and the casing 100 of the phone. The slot 124 extends in the upward direction. In the interior of the slot 124, the outward face of the slot 124 has an inclined abutting surface 122. The sloping abutting surface 122 forms a plane which is parallel to the widthwise direction and which forms an acute angle a with the lengthwise direction. The slot 124 is sized to receive the protrusion 26 and the abutting surfaces 122 and 22 are arranged so that they are urged against each other in the lengthwise direction when the cover is attached to the phone.

Figure 7:
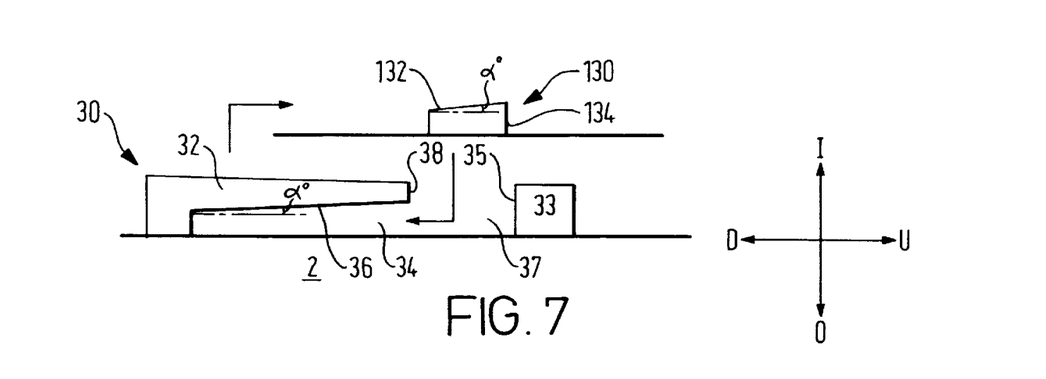
FIG. 7 shows a further type of clasp, which attaches the cover to the phone

The second clasp 30 and the second corresponding clasp 130 form a fastening as illustrated in more detail in FIG. 7. The second clasp 30 has a first protrusion 32 and a second protrusion 33 defining between them an aperture 37. The first protrusion 32 extends in the lengthwise direction and a recess 34 is formed between the protrusion 32 and the cover 2. In the recess, on the inward direction side, the protrusion has an inclined abutting surface 36. The sloping abutting surface forms a plane which is parallel to the widthwise direction and which forms an acute angle a with the lengthwise direction. The first protrusion 32 also has a stopping surface 38 defining the downward side of the aperture 37 to the recess 34. The second protrusion 33 has a stopping surface 35, which defines the upward side of the aperture 37. The stopping surface 35 extends from the cover 2 and has a face, which is perpendicular to the lengthwise direction. The first corresponding clasp 130 is formed from a protrusion, which has a sloping abutting surface 132 and a stopping surface 134. The protrusion is elongate and extends in the lengthwise direction. The abutting surface 132 is formed on the inward face of the protrusion. The abutting surface 132 is a plane which is parallel to the widthwise direction and which forms an acute angle a with the lengthwise direction. The stopping surface 134 is planar and perpendicular to the lengthwise direction. The aperture 37 and second corresponding clasp 130 are sized so that the corresponding clasp 130 can be moved in the outwards direction through the aperture 37 and then slid downwards to co-operate with the first protrusion 32 of the second clasp 30. The abutting surfaces 136 and 32 are arranged to be urged together on this sliding movement thereby preventing the cover being removed in the outwards direction. The stopping surfaces 35 and 130 are arranged to limit the movement of the cover 2 with respect to the phone when the cover is slid downward with respect to the phone to remove it.

The second, third, fourth and fifth corresponding clasps 130, 140, 150 and 260 are identical. The second clasp 30 and the fourth clasp 50 are identical. The third clasp 40 and the fifth clasp 60 are identical. The third clasp 40 has the first protrusion 32 of the second clasp 30 but the second protrusion 33 is absent.

Figure 4:
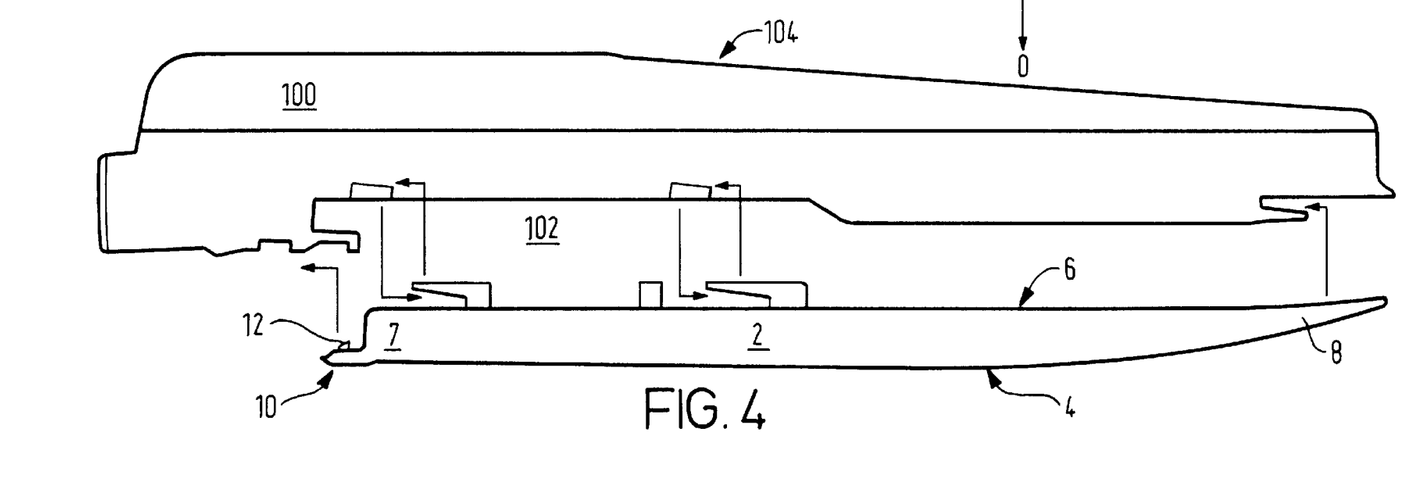
FIG. 4 illustrates how a cover is attached to a phone.

The manner in which the cover is attached to the phone is illustrated in FIG. 4.

The cover 2 is moved towards the phone in the inwards direction to fit the cover 2 to the phone. The protrusion 12 of the flexible member 10 fits into the first recess 112 of the receptacle 110. The protrusion 124 is aligned with and positioned downwards of the slot 124. The second and fourth corresponding clasps 130 and 150 pass through the apertures 37 defined by the second and fourth clasps 30 and 50 respectively and are positioned downwards of the recesses 34 defined by the first protrusions 32. The third and fourth clasps 40 and 60 are positioned downwards of the recess 34 defined by the first protrusions 32. The guiding surfaces 70 and the guiding surfaces 170 are aligned. The apertures 37 of the second and fourth clasps 30 and 50 are arranged so that the cover cannot be incorrectly attached to the phone.

The cover is slid in an upwards direction with respect to the phone along the guiding surfaces 70. The inclined abutting surfaces 22 and 36 of the clasps 20, 30, 40, 50 and 60 of the cover 2 are brought into contact with the inclined abutting surfaces 122 and 132 of the corresponding clasps 120, 130, 140, 150 and 160. This contact prevents the cover being removed from the phone in the outwards direction. As the cover is slid further in the upwards direction the clasps and corresponding clasps are urged together and the camming surface 16 of the flexible member 10 and the camming surface 116 of the receptacle 110 are urged together. The flexible member 10 rides up and over the camming surface 116 flexing outwards as it does so. This flexing arises from the cantilever member bending about its point of attachment to the cover and, in addition, from the bowing of the cover itself caused by the outward force applied to the cover through the member and the restraining forces applied by the clasps keeping the cover in place. The protrusion 12 of the flexible member then resiliently snaps back and is received by the second recess 113. The co-operation of the second recess 113 and the protrusion 12 prevent the cover being slid in the downwards direction with respect to the phone. The co-operation of the clasps 20, 30, 40, 50 and 60 and. their corresponding clasps 120, 130, 140, 150 and 160 urges the cover into close association with the phone and prevents the cover being slid too far in the upwards direction.

The cover 2 is removed from the phone by inserting a finger nail into the depression 106 behind the flexible member 10 and flexing the member in the outwards direction while simultaneously sliding the phone in the downwards direction. This flexing arises from the cantilever member bending about its point of attachment to the cover and, in addition, from the bowing of the cover itself caused by the outward force applied to the cover through the member 10 and the restraining forces applied by the clasps keeping the cover in place. This flexing unlocks the latch formed between the flexible member 10 and the receptacle 110. Flexing of the member 10 disengages it from the second recess 113 and sliding the cover disengages the clasps 20, 30, 40, 50 and 60 from the corresponding clasps 120, 130, 140, 150 and 160. The sliding of the phone is stopped by the abutment of the stopping surface 35 of the second protrusion 33 of the second and fourth clasps 30 and 50 with the stop surface 134 of the corresponding clasps 130 and 150. The cover 2 can then be easily lifted from the phone.

In the foregoing, a particular example of how one embodiment of the invention can be carried out has been described. In particular, specific fastenings have been described. However, where a recess and protrusion correspond and cooperate to form a fastening the recess may be part of the cover with the protrusion forming a part of the phone or the recess may be part of the phone with the protrusion forming a part of the recess. The invention may be practiced in many different ways without departing from the scope of the invention as defined in the claims.

What is claimed is:

1. A cover, for attachment to a mobile phone, comprising:
   an elongate body having an outer surface exposed on attachment to said phone and inner surfaces comprising guiding surfaces; and
   a lockable restraint arranged to co-operate with a corresponding restraint of the phone on said movement of the cover with respect to the phone along said guiding surfaces, said lockable restraint preventing substantial movement of the body with respect to the phone, during said cooperation, in a lengthwise direction along a lengthwise axis,
   wherein said lockable restraint comprises a resilient, outwardly flexible member defining a part of said body's outer surface, the member being arranged to resiliently flex and form a user releasable locking engagement with the corresponding restraint of the phone on said movement of the cover with respect to the phone along said guiding surfaces and arranged to be pulled outwards by the user to release said locking engagement, wherein the resilient flexibility of the member arises, at least in part, from flexibility of said cover, the cover deforming to form the releasable locking engagement with the corresponding restraint of the phone, said cover bowing about said lengthwise axis when said resilient, outwardly flexible member is pulled outwards by the user.

2. A cover as claimed in claim 1, wherein said cover is one-piece without holes, cut-outs or other apertures.

3. A cover as claimed in claim 1 wherein the resilient flexibility of the member arises in part or in whole from deformation of the cover.

4. A cover as claimed in claim 1 wherein said flexible member has a face for abutment, substantially perpendicular to said lengthwise direction, forming a part of said inner surfaces.

5. A cover as claimed in claim 1 wherein said member extends from one edge of body.

6. A cover as claimed in claim 1 wherein said lockable restraint comprises a third restraint and a fourth restraint positioned with lengthwise separation, said fourth restraint comprising said flexible member.

7. A cover as claimed in claim 6 wherein said third and fourth restraints are positioned at opposing lengthwise extremities of the body.

8. A cover as claimed in claim 6 wherein said third restraint is a clasp defining a face for abutment, substantially perpendicular to said outwards direction, forming a part of said inner surfaces.

9. A cover as claimed in claim 8, wherein said second face slants forming an acute angle to the lengthwise direction.

10. A cover as claimed in claim 6, wherein said third restraint is a tongue extending from the inner surfaces of the body substantially in said lengthwise direction.

11. A cover as claimed in claim 1 wherein said cover further comprises clasps arranged to releasably co-operate with correspondingly positioned clasps of the phone on movement of the cover with respect to the phone along said guiding surfaces, said clasps allowing substantial movement of the body with respect to the phone, during said co-operation, in said lengthwise direction only.

12. A cover as claimed in claim 11 wherein each of said clasps define a first face for abutment, substantially perpendicular to said outward direction but forming an acute angle to the lengthwise direction.

13. A cover as claimed in claim 1 wherein said cover further comprises surfaces arranged to releasably co-operate with correspondingly positioned surfaces of the phone on movement of the cover with respect to the phone along said guiding surfaces and thereby urge the phone and cover into closer contact.

14. A cover as claimed in claim 1 wherein said guiding surfaces are substantially flat, and each surface has one or more low relief bumps thereon.

15. A mobile phone, having a cover attached thereto, said cover comprising:
an elongate body having an outer surface exposed on attachment to said phone and inner surfaces comprising first and second guiding surfaces; and
a lockable restraint arranged to co-operate with a corresponding restraint of the phone on said movement of the cover with respect to the phone along said guiding surfaces, and thereby preventing substantial movement of the body with respect to the phone in a lengthwise direction along a lengthwise axis,
wherein said lockable restraint of the cover or the corresponding restraint of the phone comprises a resilient, outwardly flexible member arranged to resiliently flex and form a user releasable locking engagement between the lockable restraint and the corresponding restraint of the phone on said movement of the cover with respect to the phone along said guiding surfaces and arranged to be pulled outwards by the user, wherein the resilient flexibility of the member arises, at least in part, from flexibility of said cover, the cover deforming to form the releasable locking engagement, said cover bowing about said lengthwise axis when said resilient, outwardly flexible member is pulled outwards by the user.

16. A phone as claimed in claim 15, wherein said cover is one-piece without holes, cut-outs or other apertures.

17. A phone as claimed in claim 15 wherein the resilient flexibility of the member arises in part or in whole from deformation of the cover.

18. A phone as claimed in claim 15 wherein said flexible member has a face for abutment, substantially perpendicular to said lengthwise direction, forming a part of said inner surfaces.

19. A phone as claimed in claim 15 wherein said member extends from one edge of body.

20. A phone as claimed in claim 15 wherein said lockable restraint comprises a third restraint and a fourth restraint positioned with lengthwise separation, said fourth restraint comprising said flexible member.

21. A phone as claimed in claim 20 wherein said third and fourth restraints are positioned at opposing lengthwise extremities of the body.

22. A phone as claimed in claim 20 wherein said third restraint is a clasp defining a face for abutment, substantially perpendicular to said outwards direction, forming a part of said inner surfaces.

23. A phone as claimed in claim 22, wherein said second face slants forming an acute angle to the lengthwise direction.

24. A phone as claimed in claim 20, wherein said third restraint is a tongue extending from the inner surfaces of the body substantially in said lengthwise direction.

25. A phone as claimed in claim 15 wherein said cover further comprises releasable clasps arranged to releasably co-operate with correspondingly positioned clasps of the phone on movement of the cover with respect to the phone along said guiding surfaces, said releasable clasps allowing substantial movement of the body with respect to the phone, during said co-operation, in said lengthwise direction only.

26. A phone as claimed in claim 25 wherein each of said releasable clasps define a first face for abutment, substantially perpendicular to said outward direction but forming an acute angle to the lengthwise direction.

27. A phone as claimed in claim 15 wherein said cover further comprises surfaces arranged to releasably co-operate with correspondingly positioned surfaces of the phone on movement of the cover with respect to the phone along said guiding surfaces and thereby urge the phone and cover into closer contact.

28. A phone as claimed in claim 15 wherein said guiding surfaces are substantially flat, and each surface has one or more low relief bumps thereon.

29. A cover, for user-attachment to and detachment from a mobile phone, comprising:
an elongate body having an outer surface exposed on attachment to said phone and inner surfaces comprising first and second guiding surfaces extending substantially parallel to the length of the body; and
a resilient outwardly flexible member having an upper surface defining a part of said body's outer surface and a lower surface having a recess defined therein or a protrusion extending therefrom wherein the member is positioned at an edge of the body and arranged to be pulled outwards by a user, the member thereby flexing for detaching the cover, wherein the resilient flexibility of the member arises, at least in part, from flexibility of said cover, the cover deforming to form a releasable locking engagement, said cover bowing about a lengthwise axis when said resilient outwardly flexible member is pulled outwards by the user.

30. A mobile phone, having a user attachable/detachable cover attached thereto, said cover comprising:

an elongate body having an outer surface exposed on attachment to said phone and inner surfaces comprising first and second guiding surfaces extending substantially parallel to the length of the body; and a resilient outwardly flexible member having an upper surface defining a part of said body's outer surface and a lower surface having a recess defined therein or a protrusion extending therefrom wherein the member is positioned at an edge of the body and arranged to be pulled outwards by a user, the member thereby flexing to detach the cover, wherein the resilient flexibility of the member arises, at least in part, from flexibility of said cover, the cover deforming to form a releasable locking engagement, said cover bowing about a lengthwise axis when said resilient outwardly flexible member is pulled outwards by the user.

* * * * *